United States Patent [19]

Hayashida et al.

[11] Patent Number: 5,733,481
[45] Date of Patent: Mar. 31, 1998

[54] COMPOSITION FOR USE IN THE FORMATION OF AN ACTIVE LIGHT WAVEGUIDE, METHOD FOR MANUFACTURING AN ACTIVE LIGHT WAVEGUIDE USING THE COMPOSITION, AND ACTIVE LIGHT WAVEGUIDE

[75] Inventors: Shigeru Hayashida; Masaki Morita, both of Hitachi; Yukinori Nagao, Nagareyama; Yoshimoto Abe, Noda; Takahisa Misono, Kawaguti, all of Japan

[73] Assignee: Hitachi Chemical Company, Ltd., Tokyo, Japan

[21] Appl. No.: 354,066

[22] Filed: Dec. 6, 1994

[30] Foreign Application Priority Data

Dec. 6, 1993 [JP] Japan ............... 5-305121

[51] Int. Cl.$^6$ ............... F21V 9/00; F21V 9/04; G02B 6/00
[52] U.S. Cl. ............... 252/582; 252/587; 385/143
[58] Field of Search ............... 252/582, 587; 385/143, 145

[56] References Cited

U.S. PATENT DOCUMENTS

| 4,933,132 | 6/1990 | Vora ............... 252/582 |
| 5,449,742 | 9/1995 | Beuhler et al. ............... 385/145 |
| 5,534,201 | 7/1996 | Summers et al. ............... 252/582 |

OTHER PUBLICATIONS

Samoc et al., Chemical Abstract 112:66093V, Abstract of J. Chem. Phys., vol. 91, No. 11, pp. 6643–6649, (1989).

*Primary Examiner*—Philip Tucker
*Attorney, Agent, or Firm*—Antonelli, Terry, Stout, & Kraus, LLP

[57] ABSTRACT

There is disclosed a composition for use in the formation of an active light waveguide comprising a fluorinated polyamic acid and an electro-optical material. The active light waveguide is manufactured by subjecting the fluorinated polyamic acid to imide ring closure into a fluorinated polyimide, and orienting the electro-optical material. The active light waveguide fabricated by using the composition for use in the formation of the active light waveguide can provide excellent electro-optical effect. The active light waveguide is extremely thermally stable and suitable to manufacture of electro-optical devices.

6 Claims, 3 Drawing Sheets

Fig. I(a)

core portion clad portion linear type

Fig. I(b)

electrode

Y-branched type

Fig. I(c)

directional coupler type

Fig. I(d)

crossing (X) type

Fig. I(e)

branched interference type

Fig. I(f)

balanced bridge type

COMPOSITION FOR USE IN THE FORMATION OF AN ACTIVE LIGHT WAVEGUIDE, METHOD FOR MANUFACTURING AN ACTIVE LIGHT WAVEGUIDE USING THE COMPOSITION, AND ACTIVE LIGHT WAVEGUIDE

BACKGROUND OF THE INVENTION

The present invention concerns a composition for use in the formation of an active light waveguide, a method for manufacturing an active light waveguide using the composition, and an active light waveguide.

For light waveguides in optoelectronics IC (OEIC), inorganic materials such as $LiNbO_3$, $LiTaO_3$, $(Pb_{1-x}La_y)(Zr_yTi_{1-y})_{(1-x)/4}O_3$ crystal (PLZT) and $Sr_2Nb_2O_7$ have been used. However, such materials involve problems, for example, having deliquescence, a low destruction threshold value, as well as a slow response speed owing to a high dielectric constant, which restrict their applicable frequency regions. On the other hand, organic polymeric materials are generally free from deliquescence, have a high destruction threshold value, and are excellent over the inorganic materials. However, since such polymeric materials generally have no orienting property and cannot be applied as they are as materials, for example, for light switches or modulation devices that utilize electro-optical effects. A method of applying a DC electric field under heating for orienting a polymeric material having no orientation property, that is, a method of developing the electro-optical effect by a polling treatment has generally been used. However, this method involves a serious problem in that the orientation is eliminated and the electro-optical effect is lost if the material is cooled to a normal temperature again and left as it is or used after polling. Ernest studies have been made on polymethylmethacrylate (PMMA) or the like as a polymeric light waveguide material. However, such a material involves a problem that the glass transition temperature (Tg) is as low as about 150° C., and the orientation property once developed by the polling is completely lost at a temperature higher than 200° C. which is applied during production of OEIC.

SUMMARY OF THE INVENTION

The present invention has been accomplished in view of the foregoing problems in the prior art and it is an object thereof to provide a composition for use in the formation of an active light waveguide which is excellent in the heat resistance and the electro-optical effect and applicable to a wide range of frequency regions, a method for manufacturing an active light waveguide using the composition, and an active light waveguide.

The present invention provides a composition for use in the formation of an active light waveguide comprising a fluorinated polyamic acid and an electro-optical material.

The present invention also relates to a method for manufacturing an active light waveguide which comprises subjecting a fluorinated polyamic acid in a composition for use in the formation of an active light waveguide to imide ring closure into a fluorinated polyimide and orienting an electro-optical material.

The present invention further relates to an active light waveguide comprising a fluorinated polyimide and an electro-optical material as constituent elements.

Here, "active light waveguide" means the light waveguide which is constructed by using a composition comprising an electro-optical material and a polymer, and which has a function such as switching, light modulating, etc. by using frequency modulation, phase modulation, refractive index variation, etc. that are induced by an outside stimulation, for example, applying a voltage and/or irradiation of light.

DESCRIPTION OF THE PREFERRED EMBODIMENTS

A fluorinated polyamic acid used in the present invention is a polyamic acid having, for example, fluoro or fluoro alkyl groups and can be prepared under the same conditions as those for the production of usual polyamic acids. Generally, it can be produced by reacting a diamine and a tetracarboxylic acid or a derivative thereof, at least one of which is substituted with fluoro or fluoroalkyl groups in an organic polar solvent such as N-methyl2-pyrrolidone(NMP), N,N-dimethylacetamide or N,N-dimethylformamide.

The diamine substituted, for example, with fluoro or fluoroalkyl groups can include, for example, 3-fluoro-1,2-phenylene diamine, 4-fluoro-1,2-phenylene diamine, 3,4-difluoro-1,2-phenylene diamine, 3-fluoro-1,3-phenylene diamine, 4-fluoro-1,3-phenylene diamine, 3,4-difluoro-1,3-phenylene diamine, 3-fluoro-1,4-phenylene diamine, 4-fluoro-1,4-phenylene diamine, 3,4-difluoro-1,4-phenylene diamine, 3-trifluoromethyl-1,2-phenylene diamine, 4-trifluoromethyl-1,2-phenylene diamine, 3-trifluoromethyl-1,3-phenylene diamine, 4-trifluoromethyl-1,3-phenylene diamine, 3-trifluoromethyl-1,4-phenylene diamine, 4-trifluoromethyl-1,4-phenylene diamine, 2,2'-bis(trifluoromethyl)-4,4'-diamino biphenyl, 2,2'-difluoro-4,4'-diamino biphenyl.

Further, the tetracarboxylic acid substituted with fluoro or fluoroalkyl groups, as well as the acid anhydride, acid chloride and esterification product as the derivative thereof can include, for example, 1-fluoropyromellitic acid, 1,4-difluoropyromellitic acid, 1-trifluoromethyl pyromellitic acid, 2,2-bis(2,3-dicarboxyphenyl)-hexafluoropropane, 1,4-bis(3,4-dicarboxy trifluorophenoxy)tetrafluorobenzene, 2,2'-difluoro-3,3',4,4'-biphenyl tetracarboxylic acid, 1,1,1,3,3,3-hexafluoro-2,2-bis(3,4-dicarboxyphenyl) propane, as well as acid anhydride, acid chloride and esterification product thereof.

It is preferred that the fluorinated polyamic acid in the present invention provides a fluorinated polyimide that has a refractive index of 1.4 to 1.9 (at 589 nm), a dielectric constant of 2.6 to 3.5 (at 1 MHz) and a glass transition temperature (Tg) of 300° C. or higher when the acid is subjected to imide ring closure into the fluorinated polyimide, with a view point, for example, of the electro-optical effect and heat resistance. The fluorinated polyimide having a dielectric constant of more than 3.5 may provide poor performance due to slow response speed of switching and frequency modulation. The fluorinated polyimide having a Tg of less than 300° C. may provide poor heat resistance at the solding step in manufacturing of a device, which leads to difficult manufacturing of the device.

In view of the electro-optical effect and the heat resistance, the fluorinated polyamic acid in the present invention is preferably a fluorinated polyamic acid comprising at least one member selected from the group consisting of a repeating unit represented by the formula (I-1), a repeating unit represented by the formula (I-2), a repeating unit represented by the formula (II-1) and a repeating unit represented by the formula (II-2) as follows.

The repeating units of the formulae (I-1), (I-2), (II-1) and (II-2) constitute all of the repeating units of the polyamic acid and may be contained in various proportions. For example, all of the repeating units in the polyamic acid may be (I-1) or (I-2), and may be (II-1) or (II-2).

Further, the fluorinated polyamic acid comprising (A) at least one member selected from the group consisting of a repeating unit represented by the formula (I-1) and a repeating unit represented by the formula (I-2), and (B) at least one member selected from the group consisting of a repeating unit represented by the formula (II-1) and a repeating unit represented by the formula (II-2)

is more preferred.

The repeating units of the formulae (I-1), (I-2), (II-1) and (II-2) constitute all of the repeating units of the polyamic acid and may be contained in various proportions. For example, the molar ratio of (I-1) or (I-2)/(II-1) or (II-2) in the polyamic acid may be ¼, ⅗ or ½.

Here, the difference between the repeating units represented by the formulae (I-1) and (I-2), and the difference between the repeating units represented by the formulae (II-1) and (II-2) are the difference of the position of amide bond, respectively. This means that there is no actual difference in properties between the repeating units represented by the formulae (I-1) and (I-2) in the polyamic acid, and no actual difference between the repeating units represented by the formulae (II-1) and (II-2) in the polyamic acid. Therefore, there is no range of the molar ratio of the repeating units represented by the formulae (I-1) and (I-2) in the polyamic acid, and no range of the molar ratio of the repeating units represented by the formulae (II-1) and (II-2) in the polyamic acid.

Advantageously, the total fluorine atoms in each repeating unit of the polyamic acid should be from 6 to 12.

The fluorinated polyamic acid comprising the repeating unit represented by the formula (I-1) or the repeating unit represented by the formula (I-2) can be provided, for example, by mixing 2,2'-bis(trifluoromethyl)-4,4'-diamino biphenyl as the diamine and pyromellitic acid anhydride as the tetracarboxylic acid anhydride in NMP as an organic polar solvent.

The fluorinated polyamic acid comprising the repeating unit represented by the formula (II-1) or the repeating unit represented by the formula (II-2) can be provided, for example, by mixing 2,2'-bis(trifluoromethyl)-4,4'-diamino biphenyl as the diamine and 1,1,1,3,3,3-hexafluoro-2,2-bis (3,4-dicarboxyphenyl)propane dianhydride as the tetracarboxylic acid anhydride in NMP as an organic polar solvent.

In the present invention, the diamine may be used singly or as a mixture thereof, and the tetracarboxylic acid or the derivative thereof may be also used singly or as a mixture thereof.

The diamine, the tetracarboxylic acid or derivative thereof may be used in various proportions, but it is preferable that the sum for the mol number of one or plurality of diamines is equal or substantially equal to the sum for the mol number of one or plurality of tetracarboxylic acids or derivatives thereof.

Further, diamine and tetracarboxylic acid not substituted with fluoro or fluoroalkyl groups, as well as derivatives thereof, for example, pyromellitic acid anhydride, may be used. For example, when the diamine substituted with fluoroalkyl groups is used, tetracarboxylic acid anhydride not substituted with fluoroalkyl groups may be used in amount of the same mol number as that of the diamine without using tetracarboxylic acid anhydride substituted with fluoro or fluoroalkyl groups.

In the solution of the fluorinated polyamic acid obtained by reaction between the diamine and the tetracarboxylic acid or the derivative thereof, the concentration of a solid content in the solution is preferably from 5 to 40% by weight, particularly, from 10 to 25% by weight. Further, the fluorinated polyamic acid, at 15% by weight of the solid content, has a rotational viscosity (a viscosity measured by using a rotational viscometer) (at 20° C.) in an N-methyl-2-pyrrolidone solution of, preferably, from 2000 to 8000 mPa.s, more preferably, from 4000 to 6000 mPa.s. Further, the fluorinated polyamic acid preferably has 10,000 to 200,000 of number average molecular weight.

The refractive index of the fluorinated polyimide obtained by subjecting the fluorinated polyamic acid to the imide ring closure in the present invention can be adjusted easily by properly selecting the kind and the amount of the diamine and the tetracarboxylic acid or the derivative thereof used.

For instance, if the content of the repeating unit represented by the formula (I-1) or the repeating unit represented by the formula (I-2) is increased in the fluorinated polyamic acid, the refractive index of the resultant fluorinated polyimide can be increased. On the other hand, if the content of the repeating unit represented by the formula (II-1) or the repeating unit represented by the formula (II-2) is increased in the fluorinated polyamic acid, the refractive index of the resultant fluorinated polyimide can be decreased.

In view of the electro-optical effect and the heat resistance, the fluorinated polyimide in the active light waveguide of the present invention is preferably a fluorinated polyimide comprising at least one member selected from the group consisting of a repeating unit represented by the formula (I) and a repeating unit represented by the formula (II) as follows.

These repeating units may be contained in various proportions in the fluorinated polyimide. For example, all of the repeating units in the fluorinated polyimide may be (I) or (II).

Further, the fluorinated polyimide comprising a repeating unit represented by the formula (I) and a repeating unit represented by the formula (II) is more preferred. These repeating units may be contained in various proportions in the fluorinated polyimide. For example, the molar ratio of (I)/(II) in the fluorinated polyimide may be ¼, 3/7 or 1/1.

As the electro-optical material in the present invention, any of known materials may be used, for example, there can be used perylene compounds and the compounds having the following structure (refer to KAGAKU TO KOGYO, Vol. 6, p.769, 1994).

Among them, perylene compounds are preferred and a perylene compound having asymmetrical structure is particularly preferred with a view point of the heat resistance and the electro-optical effect. A preferred perylene compound having the asymmetric structure is an asymmetric 3,4:9,10-perylene bis(dicarboxyimide) compound represented by the following formula (III), or an asymmetric 3,4:9,10-perylene bis(dicarboxyimide) compound represented by the following formula (IV):

(III)

(IV)

wherein $R^1$ represents a hydrogen atom, an alkyl group having 1 to 6 carbon atoms, a fluoroalkyl group having 1 to 6 carbon atoms, an aryl group having 6 to 10 carbon atoms and substituted with at least one alkyl group or alkoxy group, or an aryl group having 6 to 10 carbon atoms and substituted with at least one fluoroalkoxy group; $R^2$ represents an amino group, an alkoxy group having 1 to 4 carbon atoms, a nitrile group or a nitro group, Ar represents an aryl group having 6 to 10 carbon atoms and having at least one substituent such as a nitro group, a cyano group, an amino group, a pyrrolidino group, a nitrophenylazo group, etc. When the above fluoroalkyl group and fluoroalkoxy group are shown as $-C_nF_mH_{(2n+1)-m}$ and $-OC_nF_mH_{(2n+1)-m}$, respectively, the number of m is $1 < m \leq 2n+1$.

As the asymmetric 3,4:9,10-perylene bis(dicarboxyimide) compounds represented by the formulae (III) and (IV), there can be mentioned, for example, the following compounds.

(P-1)

(P-2)

(P-3)

(P-4)

(P-5)

The asymmetric 3,4:9,10-perylene bis(dicarboxyimide) compound represented by the formula (III) or (IV) can be synthesized as described below. That is, the compound of the formula (III) or (IV) can be synthesized, respectively, by reacting 3,4:9,10-perylene tetracarboxylic acid monoanhydride=monoimide obtained by reaction between 3,4:9,10-perylene-tetracarboxylic acid anhydride (V) and an amine and represented by the formula (VI), and an aromatic diamine derivative or an aromatic amine derivative. The reactions are reported, for example, in the Journal of the Chemical Society of Japan (p.528, 1978, p.1391, 1980). Descriptions will now be made specifically to a process for synthesizing the asymmetric 3,4:9,10-perylene bis (dicarboximide) compound represented by the formula (III) or (IV).

In the above formulae (V) and (VI), $R^1$ represents a hydrogen atom, an alkyl group having 1 to 6 carbon atoms, a fluoroalkyl group having 1 to 6 carbon atoms, an aryl group having 6 to 10 carbon atoms and substituted with at least one alkyl group or alkoxy group, or an aryl group having 6 to 10 carbon atoms and substituted with at least one fluoroalkoxy group.

The compound represented by the formula (VI) as a raw material for the synthesis of the asymmetric 3,4:9,10-perylene bis(dicarboxyimide) compound represented by the formula (III) or (IV) can be synthesized as described below. An appropriate amount of water and 3,4:9,10-perylene tetracarboxylic acid anhydride (V) (12.8 mmol) are placed into a three-necked flask, and kept at a temperature of 20°–40° C. under stirring in a thermostable bath, to which an amine compound (130 mmol) kept at the same temperature is added altogether and reacted. The reaction time is from 20 to 360 min. After the reaction, salting out with hydrochloric acid is applied, and precipitates are filtered and sufficiently washed with water to remove the amine, which are then put into a 1% potassium hydroxide solution and applied with hot filtration under heating. Potassium chloride is added to 10% concentration to the filtrate obtained by hot filtration, thereby depositing the precipitates. Purification is attained by repeating the salting out, to obtain the compound represented by the formula (VI).

As the 3,4:9,10-perylene-tetracarboxylic acid monoanhydride=monoimide compound represented by the formula (VI), there can be mentioned, for example, the following compounds.

The compound represented by the formula (III) can be synthesized as described below. The compound of the formula (VI) (2.5 mmol) and orthophenylene diamine derivative (32 mmol) are placed in a three-necked flask and reacted by heating at 180° C. for 4 hours under stirring. Methanol is added to a reaction mixture which is allowed to cool and precipitates are separated by filtration and washed with methanol. 1% solution of potassium hydroxide is added to the precipitates and heated and filtered. Then, after treating with an alkaline solution of sodium dithionite (200 parts of water, 4 parts of potassium hydroxide, 4 parts of sodium dithionite) at 45° C. for 15 min, soluble matters are removed by filtration, and residues are placed in water and rendered acidic with hydrochloric acid. Then, precipitates are separated by filtration, washed with water and then dried to obtain the compound of the formula (III) Further, the compound represented by the formula (IV) can be synthesized as described below. The compound of the formula (III) (2.5 mmol) and an aromatic amine derivative (32 mmol) are placed in a three-necked flask and then reacted by heating at 180° C. for 6 hours under stirring. Methanol is added to a reaction mixture which is allowed to cool and precipitates are separated by filtration and washed with methanol. 1% solution of potassium hydroxide is added to the precipitates and filtered under heating. Then the resultant precipitates are washed with water, washed with methanol and then dried to obtain a compound represented by the formula (IV).

The composition for use in the formation of the active light waveguide of the present invention can be manufactured with ease, for example, by adding an electro-optical material to a solution of a fluorinated polyamic acid in a polar organic solvent and mixing by stirring or the like. In this instance, the amount of the electro-optical material used is preferably from 0.1 to 10 parts by weight, more preferably, from 0.5 to 5 parts by weight and, most preferably, from 0.5 to 3 parts by weight based on 100 parts by weight of the fluorinated polyamic acid. If the amount of use is either insufficient or excessive, it tends to deteriorate the electro-optical characteristic and other optical characteristic, as well as the mechanical property, stability and processability.

Description will now be made to an active light waveguide using the composition for use in the formation of the active light waveguide according to the present invention. The active light waveguide of the present invention is applicable, for example, to an optical matrix switch, modulator, optical deflector and optical isolator. FIGS. 1(a) –1(f) are schematic views of a fundamental mode of the optical matrix switch, modulator or the like. The light waveguide can be formed by using a general film-forming method such as a spin coating method, a dipping method, a doctor blade method, a wire bar method, a roller method or a spray method. The core material and the clad material for the light waveguide can be selected so as to attain a difference of refractive index suitable to light wavelength and application use.

The active light waveguide according to the present invention can be formed from a composition for use in the formation of the active light waveguide, for example, by spin-coating or a silicon substrate with the composition and applying heat treatment in a nitrogen atmosphere, thereby subjecting the fluorinated polyamic acid in the composition for use in the formation of the active light waveguide into a fluorinated polyimide, and orienting the electro-optical material. For imidization, a conventional method for imidization such as heating can be used. For instance, descriptions will be made, for example, to fabrication of a directional coupler type light switch as one embodiment of the active light waveguide with reference to FIG. 2. There are shown a substrate 1, a lower electrode 2, a lower clad layer 3, a core layer 4, an aluminum layer 5, a resist layer 6, an upper clad layer 7 and an upper electrode 8. The lower electrode 2 made of aluminum or the like is formed on a substrate 1 made of silicon or the like by vapor deposition, sputtering or the like. The lower clad layer 3 is composed of a fluorinated polyimide represented by the formula (I), which is obtained by coating the fluorinated polyamic acid represented by the formula (I-1) or (I-2) on the lower electrode 2, and heat-curing the fluorinated polyamic acid (the heating step at, for example, about 350° C., for converting the fluorinated polyamic acid to the fluorinated polyimide) and which has a refractive index smaller than that of the core layer 4 as mentioned below. The core layer 4 is obtained by coating the composition for use in the formation of the active light waveguide according to the present invention (containing the electro-optical material and the fluorinated polyamic acid represented by the formula (I-1) or (I-2)) in a predetermined thickness on the lower clad layer 3, and heat-curing the composition. Then, after depositing the aluminum layer 5 on the core layer 4 by vapor deposition or the like, resist coating, pre-baking, exposure, development and after-baking are applied to obtain the patterned resist layer 6 on the aluminum layer 5. After removing the aluminum layer 5 not protected by the resist layer 6 by wet etching, the core layer 4 and the lower clad layer 3 not protected by the aluminum layer 5 is removed by dry etching. The residual aluminum layer 5 and resist layer 6 are removed by wet etching, on which the upper clad layer 7 is formed by using the polyimide used for forming the lower clad layer 3 described above. Finally, the upper electrode 8 is formed over a predetermined core layer 4 through a mask pattern by vapor deposition or sputtering, to obtain a directional coupler type light switch.

Here, it is necessary to use a composition comprising a fluorinated polyamic acid and an electro-optical material of the present invention as a material for preparing the core layer 4. However, not only the fluorinated polyamic acid in the composition of the present invention but also other polyamic acid without fluoro or fluoroalkyl group can be used as a material for preparing the clad layers 3 and 7 as long as the difference of the refractive index between the core layer 4 and the clad layers 3 and 7 is 1% or less, preferably, 0.5% or less, the refractive index of the clad layers 3 and 7 is smaller than that of the core layer 4, and the glass transition temperature (Tg) of the clad layers 3 and 7 is 300° C. or higher.

The electro-optical material contained in the core layer in the active light waveguide can be oriented by a polling treatment or the like. For instance, the electro-optical material can be oriented simultaneously by heating under application of an electric field, thereby applying imidization by imide ring closure. The electric field can be applied, for example, by a method of disposing the electrode, charging the surface by corona discharge or the like. The strength of the electric field is preferably $10^5$ V/cm, more preferably, higher than $10^6$ V/cm. In case that the electrical field is applied by a method of disposing the electrode, for example, $10^5$ V/cm of the electrical field is applied between the lower electrode 2 and the upper electrode 8. Alternatively, the electro-optical material can also be oriented by applying imidization with the imide ring closure, to obtain the fluorinated polyimide as the final structure and then heating to a temperature higher than Tg by applying an electric field.

The thickness of each layer in the above directional coupler type light switch is 10 μm or less, preferably, 2–5 μm. The waveguide is usually formed approximately into 10–15 μm width, 3–4 μm height, and 2–3 μm pattern pitch.

The present invention has a feature in using the fluorinated polyimide having the highest heat resistance among plastics to one or both of the core layer and the clad layer of the light waveguide. It has also another feature of incorporating the 3,4:9,10-perylene bis(dicarboxyimide) compound which is an electro-optical material of excellent heat resistance into the fluorinated polyimide. It also has a further feature of providing excellent heat stability upon fabrication of the light waveguide by using the fluorinated polyimide and the 3,4:9,10-perylene bis(dicarboxyimide) compound of excellent heat resistance. Further, it has a merit capable of easily preparing a large area light waveguide by the spin coating method, thereby enabling to reduce the cost of the light waveguide.

Description will now be made more specifically to the present invention by way of examples but the invention is not restricted only to the examples described below.

PREPARATION EXAMPLE 1

Synthesis of N-methyl-3,4:9,10-perylene tetracarboxylic acid monoanhydride=monoimide (A-1)

100 ml of water and 5 g (12.8 mmol) of 3,4:9,10-perylene tetracarboxylic acid anhydride (V) were placed in a three-necked flask, kept at a temperature of 20° C. in a thermostable bath under stirring, to which 7.8 g of 40% methyl amine which was previously kept at the identical temperature was added altogether and reacted for 25 min under stirring. After the reaction, salting-out with hydrochloric acid was applied, and precipitates were filtered and washed with water sufficiently to remove the amine and the residue was placed in 1% solution of potassium hydroxide and heated and applied with hot filtration. Heating and hot-filtration of the precipitates were further repeated in the 1% solution of potassium hydroxide till the red color of the filtrate was faded, to remove alkali insoluble matters. All the filtrates obtained by the hot-filtration were collected and potassium chloride was added to 10% concentration, thereby depositing the compound A-1 as a potassium salt and dissolved starting materials were removed. Purification was conducted by repeating the salting-out and, finally, salting-out was applied with addition of hydrochloric acid and then it was washed with water and dried to obtain the compound A-1.

PREPARATION EXAMPLES 2 THROUGH 4

Synthesis of A-2, A-3 and A-4

Synthesis was conducted in the same procedures as those in Preparation Example 1 while replacing 7.8 g of 40% methyl amine with 9.4 g of ethylamine, 9.0 g of propyl amine and 9.4 g of butyl amine each at 70% concentration, respectively, to obtain N-ethyl-3,4:9,10-perylene tetracarboxylic acid monoanhydride=monoimide (A-2), N-propyl-3,4:9,10-perylene tetracarboxylic acid monoanhydride=monoimide (A-3), and N-butyl-3,4:9,10-perylene tetracarboxylic acid monoanhydride=monoimide (A-4).

PREPARATION EXAMPLE 5

Synthesis for p-(2,2,2-trifluoroethoxy) aniline

Under a nitrogen atmosphere, 10.1 g (0.44 mol) of sodium was dissolved in 200 ml of 2,2,2-trifluoro ethanol in 300 ml of a three-necked flask, to which 40 ml (0.38 mol) of p-fluoronitro benzene was dropped and refluxed for 4 hours. After cooling to a room temperature, water was poured (about 1 liter), and precipitated solids were washed with water and dried, to obtain p-(2,2,2-trifluoroethoxy) nitrobenzene (yield: 62%; and melting point: 76.5° C.).

In a nitrogen atmosphere, 30.1 g (0.14 mol) of p-(2,2,2-trifluroethoxy) nitrobenzene, 82.1 g (1.47 mol) of reduced iron, 120 ml of ethanol and 40 ml of water were placed in a three-necked flask, to which 1.4 ml of concentrated hydrochloric acid was dropped under stirring and then refluxed for one hour. After cooling to a room temperature, it was separated by filtration, and the reaction solution was poured into iced water (about 2 liter), and precipitated solids were washed with water and then dried, to obtain 24.4 g (0.13 mol) of p-(2,2,2-trifluoroethoxy) aniline as pink solids. The yield was 94% and the melting point was 69.4° C.

PREPARATION EXAMPLE 6

Synthesis of p-trifluoromethoxy aniline

Synthesis was conducted in the same way as in Preparation Example 5 while replacing 2,2,2-trifluoroethanol in Preparation Example 5 with trifluoromethanol, to obtain 23.6 g (0.13 mol) of p-trifluoromethoxy aniline. The melting point was 63.5°C.

PREPARATION EXAMPLES 7 THROUGH 9

Synthesis of A-5, A-6 and A-7

Synthesis was conducted in the same procedures as those in Preparation Example 1 while replacing 7.8 g of 40% methyl amine with 18.7 g of p-methoxyaniline, 26.9 g of p-trifluoromethoxy aniline, 29.0 g of p-(2,2,2-trifluoroethoxy) aniline, to obtain N-p-methoxy-phenyl-3,4:9,10-perylene tetracarboxylic acid monoanhydride=monoimide) (A-5), N-p-trifluoromethoxy phenyl-3,4:9,10-perylene tetracarboxylic acid monoanhydride=monoimide (A-6), and N-p-(2,2,2-trifluoroethyoxy) phenyl-3,4:9,10-perylene tetracarboxylic acid monoanhydride=monoimide (A-7), respectively.

PREPARATION EXAMPLE 10

Synthesis of P-1

To a three-necked flask, 1.0 g (2.5 mmol) of the compound A-1 synthesized in Preparation Example 1 and 3.9 g (32 mmol) of 4-nitro-1,2-phenylene diamine were placed in a three-necked flask and reacted by heating at 180° C. for 4 hours under stirring. Methanol was added to a reaction mixture allowed to cool, and precipitates were separated by filtration and washed with methanol to remove 4-nitro-1,2-phenylene diamine. 1% solution of potassium hydroxide was added to the precipitates, heated and filtered to remove unreacted A-1. Then, after treating the precipitates with an alkaline solution of sodium dithionite (200 parts of water, 4 parts of potassium hydroxide and 4 parts of sodium dithionite) at 45° C. for 15 min, soluble matters were removed by filtration, the residue was placed in water and rendered acidic with hydrochloric acid, and precipitates were separated by filtration, washed with water and dried to obtain 1.0 g of 3,4:9,10-perylene bis(dicarboxyimide) benzoimidazol derivative P-1 (yield 80%). Table 1 shows the results for the measurement of elemental analysis value, absorption maximum wavelength and mass spectrum (m/e).

PREPARATION EXAMPLES 11 THROUGH 13

Synthesis of P-2, P-3 and P-4

Synthesis was conducted in the same procedures as those in Preparation Example 10 while replacing 1.0 g of the compound A-1 with 1.0 g (2.5 mmol) of the compound A-2, 1.1 g (2.5 mmol) of the compound A-3 and 1.1 g (2.5 mmol) of the compound A-4 respectively in Preparation Example 10, to obtain 3,4:9,10-perylene bis(dicarboxyimide) benzoimidazol derivatives, namely, 1.0 g of P-2 (78% yield), 1.1 g of P-3 (79% yield) and 1.1 g of P-4 (78% yield). Table 1 shows the results for the measurement of elemental analysis value, absorption maximum wavelength and mass spectrum (m/e).

PREPARATION EXAMPLES 14 THROUGH 16

Synthesis of P-5, P-6 and P-7

Synthesis was conducted in the same procedures as those in Preparation Example 10 while replacing 1.0 g of the compound A-1 with 3.1 g (2.5 mmol) of the compound A-5, 4.4 g (2.5 mmol) of the compound A-6 and 4.8 g (2.5 mmol) of the compound A-7, respectively, in Preparation Examples 11 through 13, to obtain 3,4:9,10-perylene bis (dicarboxyimide) benzoimidazol derivatives, namely, 1.1 g of P-5 (74% yield), 1.2 g of P-6 (72% yield) and 1.2 g of P-7 (72% yield). Table 1 shows the results for the measurement of elemental analysis value, absorption maximum wavelength and mass spectrum (m/e).

PREPARATION EXAMPLE 17

Synthesis of P-8

To a three-necked flask, 1.0 g (2.5 mmol) of the compound A-1 synthesized in Preparation Example 1 and 7.7 g (32 mmol) of p-4-nitrophenyl azoaniline were placed in a three-necked flask and reacted by heating at 180° C. for 6 hours under stirring. Methanol was added to a reaction mixture allowed to cool and precipitates were filtered and separated by filtration and washed with methanol. 1% solution of potassium hydroxide was added to the precipitates, which were heated and filtered and the resultant precipitates were washed with water, washed with methanol and dried to obtain 0.5 g of 3,4:9,10-perylene-bis(dicarboxyimide) derivative P-8 (30% yield). Table 2 shows the results for the measurement of elemental analysis value, absorption maximum wavelength and mass spectrum (m/e).

PREPARATION EXAMPLES 18 THROUGH 21

Synthesis of P-9 through P-12

Synthesis was conducted in the same procedures as those in Preparation Example 17 while replacing 1.0 g of the compound A-1 with 1.0 g (2.5 mmol) of the compound A-2, 1.1 g (2.5 mmol) of the compound A-3, 1.1 g (2.5 mmol) of the compound A-4, 3.1 g (2.5 mmol) of the compound A-5, respectively, to obtain 3,4:9,10-perylene bis (dicarboxyimide) derivatives, namely, 0.5 g of P-9 (30% yield), 0.5 g of P-10 (31% yield), 0.5 g of P-11 (32% yield), 0.6 g of P-12 (34% yield). Table 2 shows the results for the measurement of elemental analysis value, absorption maximum wavelength and mass spectrum (m/e).

PREPARATION EXAMPLE 22

Synthesis of Polymer A 259.0 g of N,N-dimethylacetamide was charged in a 0.5-liter separable flask provided with a thermometer, an agitator and a drying tube, and then, 32.020 g (0.1 mol) of 2,2'-bis(trifluoromethyl)-4,4'-diaminobiphenyl was charged while being agitated. The container used for charging operation was washed with 87.08 g of N,N-dimethylacetamide, and washing liquid was poured into the flask. Dissolution of the aforesaid diaminobiphenyl was confirmed, and 44,420 g (0.1 mol) of 1,1,1,3,3,3-hexafluoro-2,2-bis(3,4-dicarboxyphenyl)propane dianhydride (produced by Hoechst Corporation as 2,2-bis(3,4-dicarboxyphenyl)-hexafluoropropane dianhydride) was charged. The container used for charging operation was washed with 87.08 g of N,N-dimethylacetamide and washing liquid was poured into the flask. Then, reacted liquid was cooled down to 15° C. and agitated for 40 hours while maintaining its temperature at 15° C. or lower. Then, after raising its temperature to 65° C., followed by cooking to obtain a polyamic acid solution (solution of Polymer A) having a viscosity of 50 poise (25° C.). The solid content in the solution was 15% by weight. The refractive index, the dielectric constant and the glass transition temperature (Tg) of the fluorinated polyimide obtained by imidization of the Polymer A are shown in Table 3.

PREPARATION EXAMPLE 23

Synthesis of Polymer B

Synthesis was conducted in the same procedures as those in Preparation Example 22 while replacing 44,420 g (0.1 mol) of 1,1,1,3,3,3-hexafluoro-2,2-bis(3,4-dicarboxyphenyl)propane dianhydride with 35.536 g (0.08 mol) of the aforesaid dianhydride and 4.362 g (0.02 mol) of pyromellitic acid anhydride in Preparation Example 22, to obtain a polyamic acid solution (solution of Polymer B) having a viscosity of 50 poise (25° C.). The solid content in the solution was 15% by weight. The refractive index, the dielectric constant and the glass transition temperature (Tg) of the fluorinated polyimide obtained by imidization of the Polymer B are shown in Table 3.

PREPARATION EXAMPLE 24

Synthesis of Polymer C

Synthesis was conducted in the same procedures as those in Preparation Example 22 while replacing 44.420 g (0.1 mol) of 1,1,1,3,3,3-hexafluoro-2,2-bis(3,4-dicarboxyphenyl)propane dianhydride with 31.094 g (0.07 mol) of the aforesaid dianhydride and 6.543 g (0.03 mol) of pyromellitic acid anhydride in Preparation Example 22, to obtain a polyamic acid solution (solution of Polymer C) having a viscosity of 50 poise (25° C.). The solid content in the solution was 15% by weight. The refractive index, the dielectric constant and the glass transition temperature (Tg) of the fluorinated polyimide obtained by imidization of the Polymer C are shown in Table 3.

PREPARATION EXAMPLE 25

Synthesis of Polymer D

Synthesis was conducted in the same procedures as those in Preparation Example 22 while replacing 44.420 g (0.1 mol) of 1,1,1,3,3,3-hexafluoro-2,2-bis(3,4-dicarboxyphenyl)propane dianhydride with 22.210 g (0.05 mol) of the aforesaid dianhydride and 10.905 g (0.05 mol) of pyromellitic acid anhydride in Preparation Example 22, to obtain a polyamic acid solution (solution of Polymer D) having a viscosity of 50 poise (25° C.). The solid content in the solution was 15% by weight. The refractive index, the dielectric constant and the glass transition temperature (Tg) of the fluorinated polyimide obtained by imidization of the Polymer D are shown in Table 3.

PREPARATION EXAMPLE 26

Synthesis of Polymer E

Synthesis was conducted in the same procedures as those in Preparation Example 22 while replacing 44.420 g (0.1 mol) of 1,1,1,3,3,3-hexafluoro-2,2-bis(3,4-dicarboxyphenyl)propane dianhydride with 21.810 g (0.10 mol) of pyromellitic acid anhydride in Preparation Example 22, to obtain a polyamic acid solution (solution of Polymer E) having a viscosity of 50 poise (25° C.). The solid content in the solution was 15% by weight. The refractive index, the dielectric constant and the glass transition temperature (Tg) of the fluorinated polyimide obtained by imidization of the Polymer E are shown in Table 3.

Example 1

A solution of a composition for use in an active light waveguide obtained by dissolving 1 part by weight of 3,4:9,10-perylene bis(dicarboxyimide) benzoimidazol derivative (P-1) as the electro-optical material prepared in Preparation Example 10, and 15 parts by weight of the Polymer A solution as the fluorinated polyamic acid prepared in Preparation Example 22 in 200 parts by weight of NMP was spin-coated at 2000 rpm on quartz glass attached with a 100 nm thick semitransparent aluminum electrode, to form a film of 2 μm thickness. Soft baking was applied in vacuum at 120° C. for 6 hours for removing the NMP solvent, and then a semitransparent aluminum electrode of 100 nm thickness was formed on the film to prepare a sandwich type specimen. The specimen was heated to 250° C. (polling temperature) at a temperature elevation rate of 2° C./min for imidization while applying a voltage at 400 V between the electrodes, and kept at that temperature for 1 hour while further applying a voltage at 400 V. Subsequently, it was cooled to a room temperature while applying the voltage at 400 V to fabricate a test specimen for the active light waveguide (the specimen includes only the core portion corresponding to the portion of the core layer 4 in FIG. 2 and contains no portion corresponding to the clad).

Figure 1A:
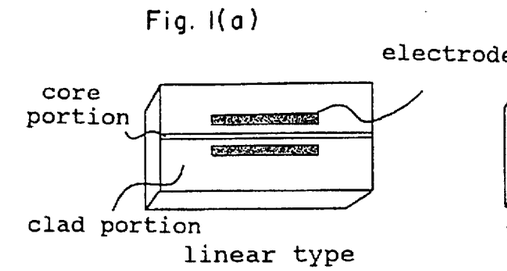
FIGS. 1(a)–1(f) are schematic views of a fundamental mode of optical matrix switches and modulators.
Figure 1B:
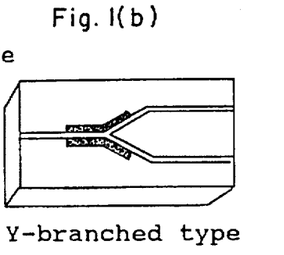
Figure 1C:
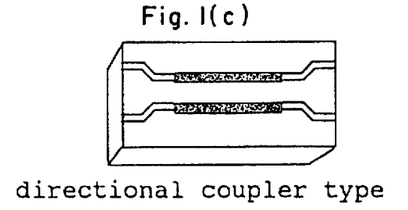
Figure 1D:
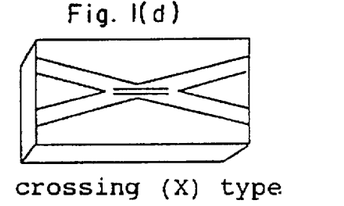
Figure 1E:
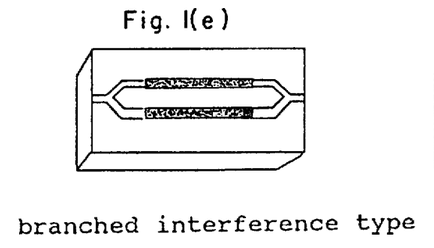
Figure 1F:
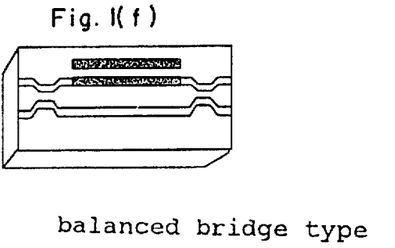
Figure 2A:
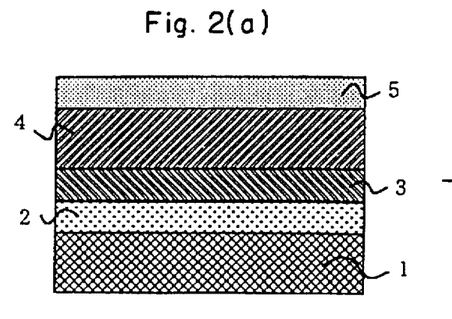
FIG. 2 is a schematic view of the steps of fabricating the active light waveguide, wherein the reference numeral 1 is a substrate, 2 is a lower electrode, 3 is a lower clad layer, 4 is a core layer, 5 is an aluminum layer, 6 is a resist layer, 7 is an upper clad layer and 8 is an upper electrode.
Figure 2B:
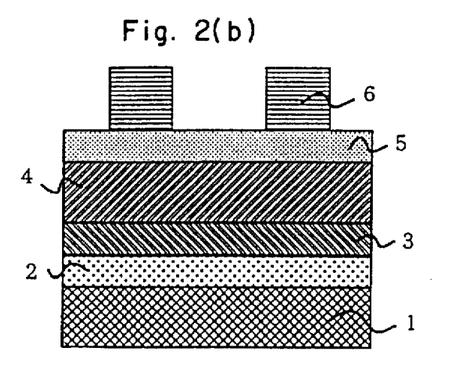
Figure 2C:
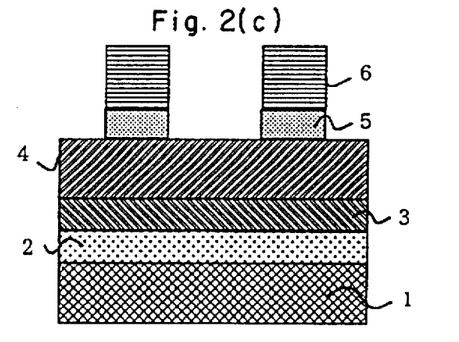
Figure 2D:
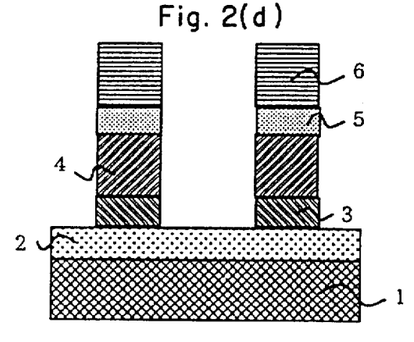
Figure 2E:
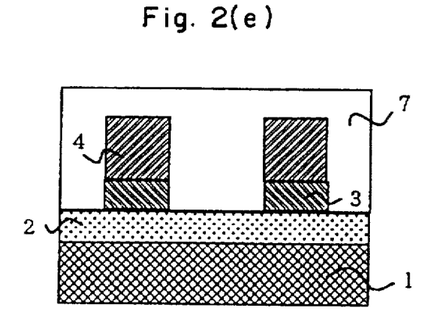
Figure 2F:
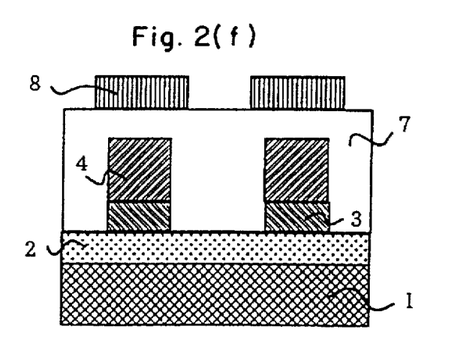
Figure 3:
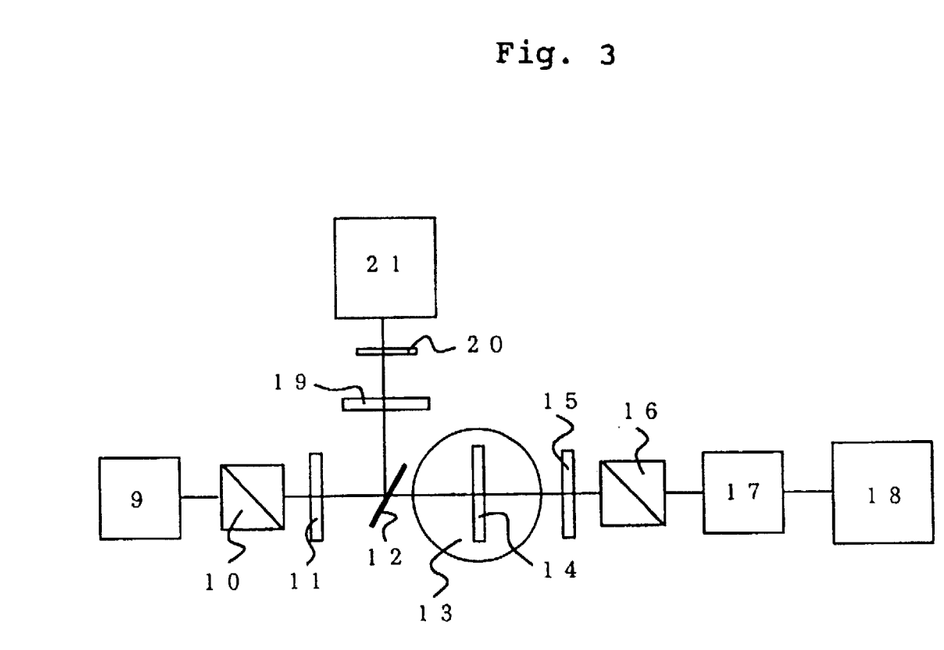
FIG. 3 is a schematic view of a SHG measuring device, wherein the reference numeral 9 is a Q switch pulse Nd:YAG laser, 10 is a polarizer, 11 is a visible light cut filter, 12 is a half mirror, 13 is a heater, 14 is a specimen, 15 is an infrared ray cut filter, 16 is a light detecter, 17 is a spectroscope, 18 is a photomultiplier, 19 is a quartz plate, 20 is an infrared ray cut filter and 21 is a photomultiplier.

Heat stability was examined for the test specimen of the active light waveguide by using a measuring device shown in FIG. 3. The measuring device shown in FIG. 3 was constituted as described below. Namely, light from a Q switch pulse Nd:YAG laser 9 was passed through a polarizer 10 and a visible light cut filter 11 to take out only the polarized component at 1.06 μm. The polarized light taken out was bisected by a half mirror 12, one of them was irradiated to a specimen 14 disposed in a heater 13, in which a specific polarization component of light at 0.532 μm emitted from the specimen 14 was passed through an infrared ray cut filter 15, a light detector 16 and a spectroscope 17 and measured by a photomultiplier 18. The other of them was irradiated to a quartz plate 19 for compensating the fluctuation of a laser power and used for monitoring light at 0.532 μm passing through an infrared ray cut filter 20 by a photomultiplier 21. The intensity of the light measured by the photomultiplier 18 at a room temperature, that is, the SHG (second harmonic generation) intensity is defined as r(0). Further, the intensity of the light measured after annealing for 50 hours at an arbitrary temperature T, that is, SHG intensity is defined as r(T). The heat stability was evaluated from a retention rate d(T) of the electro-optical characteristic obtained by using the following equation (VII) based on the r(0) and r(T), and the results are shown in Table 4.

$$d(T)=r(T)/r(0)\times 100 \qquad \text{(VII)}$$

Examples 2 through 12

Test specimens for active light waveguide were fabricated in the same procedures as those in Example 1 using the electro-optical material and the fluorinated polyamic acid shown in Table 4 instead of 3,4:9,10-perylene bis (dicarboxyimide) benzoimidazol derivative (P-1) and Polymer A used in Example 1, and the retention rate d(T) of the electro-optical characteristic was evaluated and the results are shown in Table 4.

Comparative Example 1

A test specimen for active light waveguide was fabricated in the same procedures as those in Example 1 except for using 4-(N-ethyl-N-(2-hydroxyethyl))-amino-4'-nitroazobenzene (Disperse Red 1) and a solution of polymethyl methacrylate (PMMA) (12% by weight) shown in Table 4 instead of 3,4:9,10-perylene bis(dicarboxyimide) benzoimidazol derivative (P-1) and Polymer A used in Example 1 and lowering the polling temperature to 150° C., and the retention rate d(T) of the electro-optical characteristic was evaluated and the results are shown in Table 4. 75% of the electro-optical property was eliminated by merely heating at 100° C.

TABLE 1

| Compound | R¹ | Molecular Weight | Elemental Analysis (%) *1 | | | Absorption Maximum | Mass Spectrum |
| | | | C | H | N | λ(nm) | M⁺ |
| --- | --- | --- | --- | --- | --- | --- | --- |
| P-1 | —CH₃ | 522 | 71.02 (71.26) | 2.73 (2.68) | 10.67 (10.73) | 620 | 521 |
| P-2 | —C₂H₅ | 536 | 70.94 (71.64) | 3.01 (2.99) | 10.33 (10.45) | 620 | 535 |
| P-3 | —C₃H₇ | 550 | 71.24 (72.00) | 3.29 (3.27) | 9.88 (10.18) | 621 | 549 |
| P-4 | —C₄H₉ | 564 | 70.85 (72.34) | 3.29 (3.55) | 9.25 (9.93) | 621 | 563 |
| P-5 |  —⟨◯⟩—OCH₃ | 614 | 72.11 (72.31) | 2.83 (2.93) | 9.19 (9.12) | 626 | 613 |
| P-6 |  —⟨◯⟩—OCF₃ | 668 | 65.63 (66.47) | 2.14 (2.25) | 7.57 (8.38) | 625 | 667 |
| P-7 |  —⟨◯⟩—OCH₂CF₃ | 682 | 66.16 (66.86) | 2.38 (2.49) | 7.82 (8.21) | 626 | 681 |

*1 Elemental Analysis
Upper row: measured value
Lower row: measured value (calculated value)
(structure of P-1 through P-7)

TABLE 1-continued

| | | Molecular | Elemental Analysis (%) *1 | | | Absorption Maximum | Mass Spectrum |
|---|---|---|---|---|---|---|---|
| Compound | $R^1$ | Weight | C | H | N | λ(nm) | $M^+$ |

TABLE 2

| | | Molecular | Elemental Analysis (%) *1 | | | Absorption Maximum | Mass Spectrum |
|---|---|---|---|---|---|---|---|
| Compound | $R^1$ | Weight | C | H | N | λ(nm) | $M^+$ |
| P-8 | —$CH_3$ | 629 | 71.19 (70.59) | 2.92 (3.02) | 6.99 (11.13) | 593 | 628 |
| P-9 | —$C_2H_5$ | 643 | 69.79 (70.92) | 2.90 (3.27) | 8.30 (10.89) | 593 | 642 |
| P-10 | —$C_3H_7$ | 657 | 69.42 (71.23) | 3.01 (3.50) | 8.97 (10.65) | 594 | 656 |
| P-11 | —$C_4H_9$ | 671 | 70.72 (71.53) | 3.42 (3.73) | 7.29 (10.43) | 594 | 670 |
| P-12 | —⟨⟩—$OCH_3$ | 721 | 70.01 (71.57) | 2.91 (3.19) | 6.63 (9.71) | 598 | 720 |

*1 Elemental Analysis
Upper row: measured value
Lower row: measured value (calculated value)
(structure of P-8 through P-12)

TABLE 3

| Fluorinated Polyamic acid | Refractive index (589 nm) | Dielectric constant (1 MHZ) | Glass transition temperature (°C.) |
|---|---|---|---|
| Polymer A | 1.550 | 3.0 | 330 |
| Polymer B | 1.555 | 3.0 | 340 |
| Polymer C | 1.560 | 3.0 | 360 |
| Polymer D | 1.570 | 3.0 | 386 |
| Polymer E | 1.650 | 3.0 | 410 |

TABLE 4

| | Fluorinated Polyamic acid | Electro-Optical Material | d(200° C.) (%) |
|---|---|---|---|
| Example 1 | Polymer A | P-1 | 74.5 |
| Example 2 | Polymer A | P-2 | 73.0 |
| Example 3 | Polymer A | P-3 | 73.5 |
| Example 4 | Polymer B | P-4 | 72.5 |
| Example 5 | Polymer C | P-5 | 79.5 |
| Example 6 | Polymer C | P-6 | 81.0 |
| Example 7 | Polymer C | P-7 | 82.5 |
| Example 8 | Polymer D | P-8 | 68.0 |
| Example 9 | Polymer D | P-9 | 69.5 |
| Example 10 | Polymer E | P-10 | 68.0 |
| Example 11 | Polymer E | P-11 | 69.0 |
| Example 12 | Polymer E | P-12 | 70.0 |
| Comparative Example 1 | PMMA | Disperse Red 1 | 25 (100° C.) |

According to Table 3, the refractive indexes and the dielectric constants of the fluorinated polyimides obtained by imidization of the Polymers A-E are in the range of 1.4–1.9 and 2.6–3.5, respectively, and the glass transition temperatures (Tg) of these fluorinated polyimide are 300° C. or higher. Therefore, the composition for use in the formation of an active light waveguide of the present invention has an excellent property in the heat resistance.

On the other hand, the range of frequency regions of the active light waveguide depends on the refractive index and the dielectric constant of its component. The above refractive index and dielectric constant means that the composition for use in the formation active light waveguide can be applicable to a remarkably wide range of frequency regions comparing with known inorganic materials such as $LiNbO_3$.

According to Table 4, the value of d(100° C.) of Comparative Example 1 is 25, that is, 75% of the electro-optical property was eliminated by merely heating at 100° C. However, the values of d(200° C.) of Examples 1–12 are over 60, that is, most of the electro-optical property was retained even if the test specimens for active light waveguide were heated at 200° C. These results mean that the active light waveguide of the present invention has an excellent electro-optical property.

The active light waveguide fabricated by using the composition for use in the formation of an active light waveguide according to the present invention can provide excellent electro-optical effect.

The active light waveguide according to the present invention is extremely thermally stable and suitable to manufacture of electro-optical devices such as a light switch and a modulator.

What is claimed is:

1. A composition for use in the formation of an active light waveguide comprising a fluorinated polyamic acid and an electro-optical material wherein the fluorinated polyamic acid comprises (A) at least one member selected from the group consisting of a repeating unit represented by the formula (I-1) and a repeating unit represented by the formula (I-2), and (B) at least one member selected from the group consisting of a repeating unit represented by the formula (II-1) and a repeating unit represented by the formula (II-2) and wherein the formulae (I-1), (I-2), (II-1) and (II-2) are, respectively, as follows:

2. A composition for use in the formation of an active light waveguide according to claim 1, wherein the fluorinated polyamic acid provides a fluorinated polyimide that has a refractive index from 1.4 to 1.9 (at 589 nm), a dielectric constant from 2.6 to 3.5 (at 1 MHz) and a glass transition temperature (Tg) of 300° C. or higher when the acid is subjected to imide ring closure into the fluorinated polyimide.

3. A composition for use in the formation of an active light waveguide according to claim 1, wherein the electro-optical material is a perylene compound.

4. A composition for use in the formation of an active light waveguide according to claim 3, wherein the perylene compound has an asymmetric structure.

5. A composition for use in the formation of an active light waveguide according to claim 4, wherein the perylene compound having the asymmetric structure is an asymmetric 3,4:9,10-perylene bis(dicarboxyimide) compound represented by the formula (III), or an asymmetric 3,4:9,10-perylene bis(dicarboxyimide) compound represented by the formula (IV):

wherein $R^1$ represents a hydrogen atom, an alkyl group, a fluoroalkyl group, an aryl group substituted with at least one alkyl group or alkoxy group, or an aryl group substituted with at least one fluoroalkoxy group; $R^2$ represents an amino group, an alkoxy group, a nitrile group or a nitro group; and Ar represents a phenyl group having at least one substituent selected from the group consisting of a nitro group, a cyano group, an amino group, a pyrrolidino group and a nitrophenylazo group.

6. A composition for use in the formation of an active light waveguide according to claim 1, wherein the amount of the electro-optical material in the composition is from 0.1 to 10 parts by weight based on 100 parts by weight of the fluorinated polyamic acid.

* * * * *